Dec. 10, 1963  M. TRACHTMAN  3,113,508
HAM CURING APPARATUS
Filed May 26, 1961  3 Sheets-Sheet 1
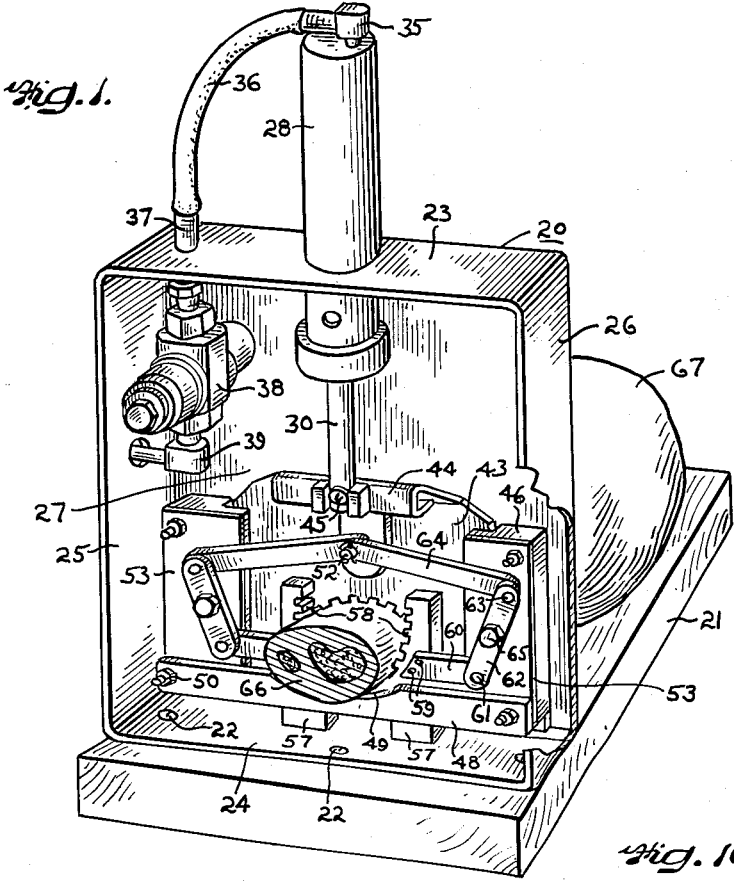
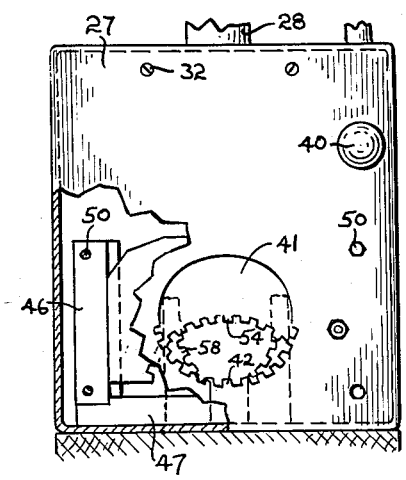
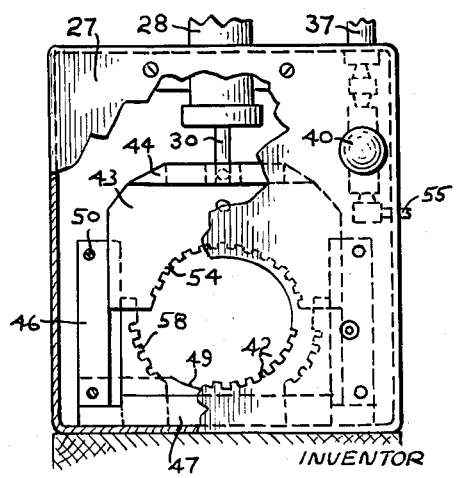
INVENTOR
MORRIS TRACHTMAN
BY *Leo Edelson*
ATTORNEY

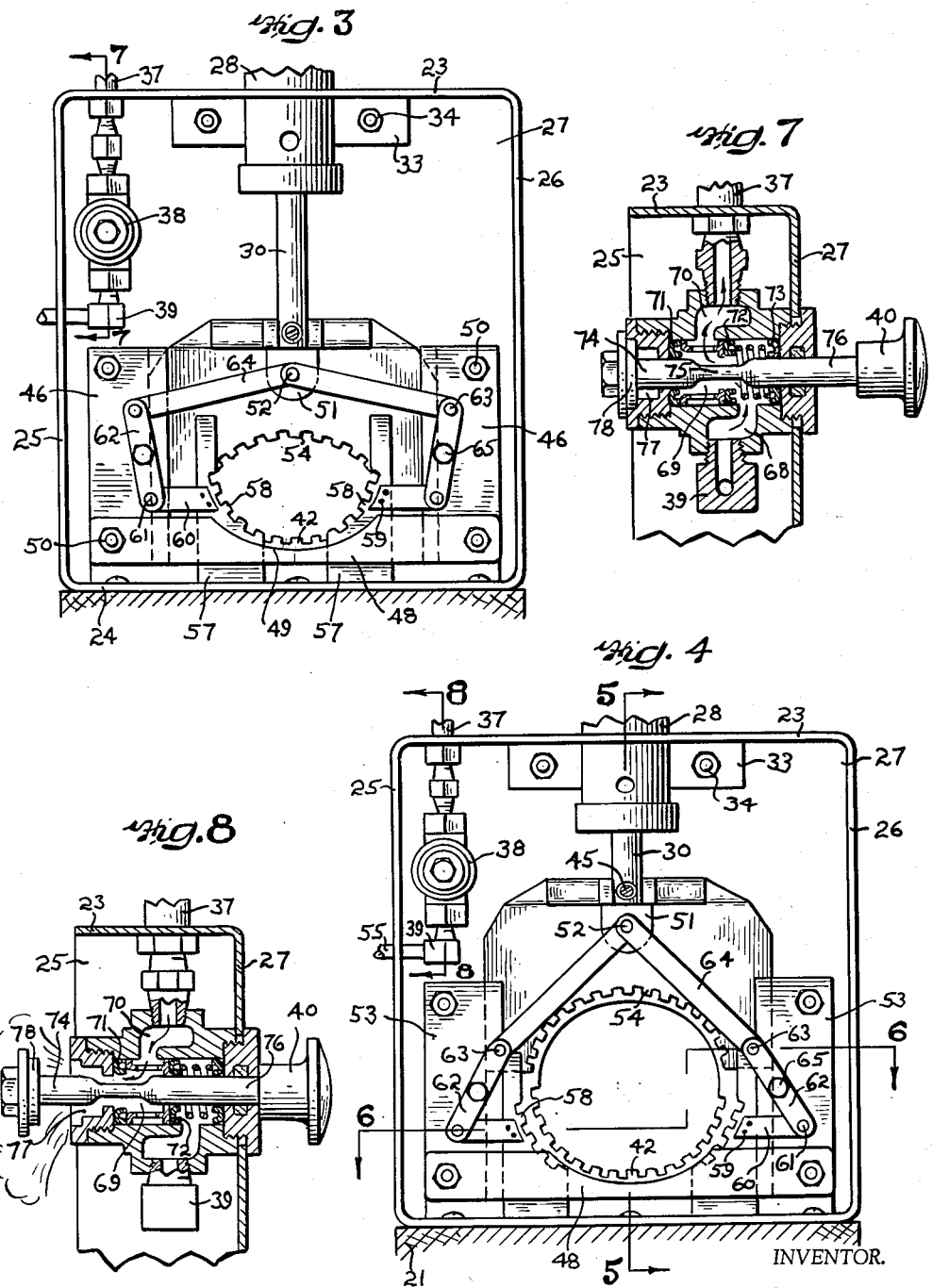

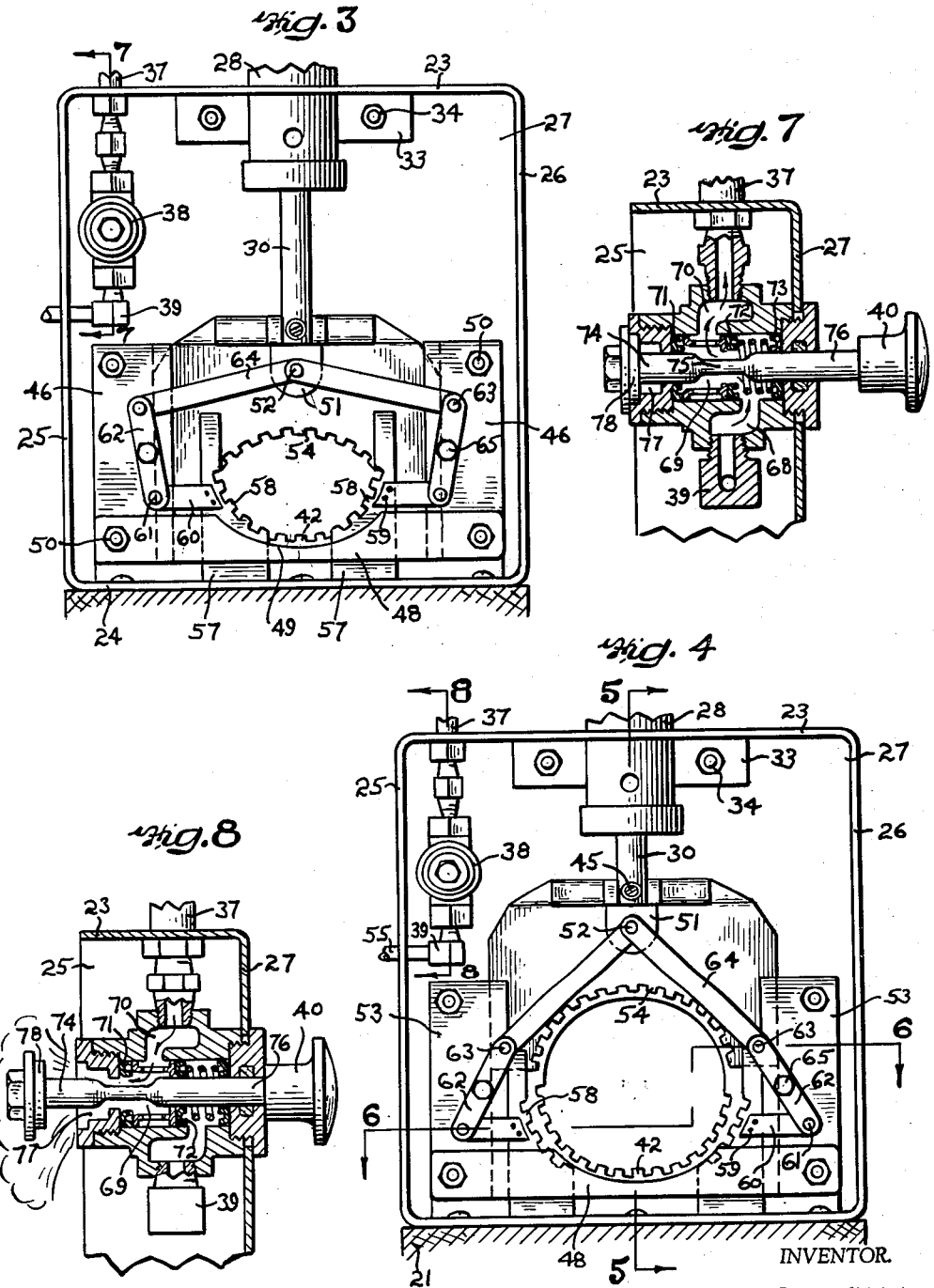

3,113,508
HAM CURING APPARATUS
Morris Trachtman, Philadelphia, Pa., assignor to Choker
Machinery Corporation, Philadelphia, Pa., a corporation of Pennsylvania
Filed May 26, 1961, Ser. No. 112,895
9 Claims. (Cl. 100—232)

This invention relates generally to apparatus for preventing the loss of pickling brine solution employed in the curing of meat for human consumption. More particularly, this invention relates to apparatus for constricting the small end or shank portion of a ham for positively closing the vascular tract to thereby prevent egress of the pickling brine solution injected into the vascular tract at the large end or butt of the ham. Moreover, the apparatus according to the invention not only closes off the main vascular tract, but, closes off all of the severed blood vessels at the shank end of the ham so that the pickling solution injected at the butt end under pressure may diffuse outwardly throughout the entire volume of the ham to thereby provide complete and uniform controlled curing action, the diffusion pressure being effectively created by the substantially complete closing off of any means by which the injected curing solution may escape from the body of the meat being cured.

In the past, devices have been marketed for the specific purpose of closing off all of the severed blood vessels at the shank end of a ham with a view toward achieving the aforementioned desirable result of uniform diffusion and substantially no loss of the injected pickling solution. While the known devices effect savings in the cost of the pickling brine solution employed, nevertheless some of the known devices which utilize rigid plate clamping members, as differentiated from looped flexible cables, are not as effective as is desirable. This is a consequence of the fact that the devices using rigid plate members as clamping devices must conform the shape of the ham shank being compressed to the shape of the clamping aperture, whereas the looped cable type of clamping device can itself adapt to variations in cross-sectional shape of the ham shank being clamped and thus provide a more effective closure. Even so, some of the rigid plate clamping device types of apparatus have the very desirable qualities of being physically rugged, easy to use, and relatively simple and inexpensive to manufacture.

The present invention is directed toward the retention of the desirable features of the rigid plate clamping device type of apparatus in a clamping apparatus which additionally overcomes the presently existing deficiency of the known devices, namely, that of not completely closing off the severed blood vessels of the ham at the shank end and hence permitting a certain amount of the injected pickling brine solution to be lost and preventing the build up within the body of the ham of the maximum degree of diffusion pressure possible. Essentially, the present invention contemplates a rigid clamping plate type of apparatus which incorporates auxiliary clamping elements that are automatically actuated through a linkage system to exert a controlled auxiliary clamping pressure along selected regions of the shank periphery to effectively completely clamp off the severed vessels at the shank end of a ham and thereby simultaneously substantially eliminate any pickling brine loss and increase the diffusion pressure operating within the body of the ham to increase the penetration of the curing solution therethroughout.

Another object of this invention is to provide a novel clamping device for quickly and efficiently closing off the severed vessels at the shank end of a ham which includes two sets of rigid clamping members shiftable respectively in directions substantially perpendicular to one another, one set of clamping members being shiftable substantially in a vertical plane and the other set of clamping members being shiftable substantially in a horizontal direction.

Yet another object of this invention is to provide a novel clamping device as aforesaid wherein the degree of clamping pressure provided by the auxiliary clamping elements is directly controlled by the degree of clamping pressure exerted by the primary clamping mechanism.

Yet a further object of this invention is to provide a novel clamping device for completely closing off the severed vessels at the shank end of a ham which is rugged in construction, positive in operation, easy to maintain in a clean and sanitary state and economical to manufacture.

The foregoing and other objects of this invention will become apparent from a reading of the following specification in conjunction with an examination of the appended drawings, wherein:

FIGURE 1 is a rear perspective view of the clamping apparatus according to the invention illustrating a ham having a shank securely and completely clamped thereby;

FIGURE 2 is a front perspective view of the apparatus of FIGURE 1 illustrating the relative dispositions of the primary and auxiliary clamping elements when shifted into a clamping position and with no ham present so that the relative disposition of the parts may be more readily seen;

FIGURE 3 is a rear elevational view of the clamping apparatus as seen in FIGURE 1 but also shown with the ham removed from the clamping aperture;

FIGURE 4 is a rear elevation of the clamping apparatus similar to that of FIGURE 3 but with the clamping elements illustrated in retracted or unclamped condition;

FIGURE 5 is an enlarged vertical sectional view through the apparatus as would be seen when viewed along the lines 5—5 of FIGURE 4;

FIGURE 6 is an enlarged horizontal section taken through the apparatus as would be seen when viewed along the line 6—6 of FIGURE 4;

FIGURE 7 is an enlarged fragmentary detail view of a manually operated control valve for controlling the shifting of the clamping elements into clamping and unclamping position by controlling the actuation of a piston reciprocable within a cylinder, the illustrated section being that which would be seen when viewed along the lines 7—7 of FIGURE 3;

FIGURE 8 is an enlarged fragmentary detail view of the manually operable control valve also seen in FIGURE 7 but illustrated as operated to deactuate the drive for the clamping element and result in the positions thereof illustrated in FIGURE 4, the section being that which would be seen when viewed along the lines 8—8 of FIGURE 4;

FIGURE 9 is a rear elevational view of the apparatus according to the invention with the control valve and movable clamping elements removed therefrom to illustrate certain structural features of the device;

FIGURE 10 is a front elevational view of the apparatus according to the invention with a portion of the front wall sectioned away; and FIGURE 11 is a front elevational view of the apparatus similar to that of the perspective showing of FIGURE 2 but also having a portion of the front wall sectioned away to show the relative position of certain of the movable clamping elements when the apparatus has been actuated.

In the several figures, like elements are denoted by like reference characters.

Referring now to the figures, and principally to FIGURES 1 to 6, there will be seen a horizontally extending base member 21 secured to one end of which by the screws or bolts 22 is an upstanding rectangular box-like frame structure 20 having a top wall 23, bottom wall 24, opposite side walls 25 and 26 and a front wall 27. Disposed through an aperture in the top wall 23 and extending vertically thereabove and below is a cylinder 28 within which is disposed a piston 29 adapted to drive a piston rod 30 which projects downward centrally from the bottom of the cylinder 28. The cylinder 28 is rigidly secured in its illustrated position by means of a pair of mounting ears 33 secured to the front wall 27 of the frame by means of the bolts 32 and nuts 34. Disposed within the cylinder 28 about the piston rod 30 is a coil compression spring 31 which biases the piston 29 upward within the cylinder 28 and maintains it in that position unless the bias provided thereby is over-ridden by pnuematic or hydraulic pressure exerted upon the upper surface of the piston 29. A pneumatic or hydraulic pressure exerting medium is selectively applied to the upper surface of the piston 29 via the cylinder upper fitting 35, hose 36 coupled at its upper end thereto and at its lower end to an outlet fitting 37 of a valve 38, the valve 38, valve inlet fitting 39 and inlet line 55 coupled to the valve inlet 39 and running to a source of pneumatic or hydraulic pressurized medium. Actuation and deactuation of the valve 38 is controlled by the control knob 40 projecting forward of the front wall 27 of the frame 20. Details of operation of the valve 38 will be described hereinafter in connection with the showings of FIGURES 7 and 8. The frame front wall 27 is generally circularly apertured proximate its lower central region as at 41 and the lower arcuate half of the opening 41 has its defining edge provided with a plurality of teeth or serrations 42 adapted to grip the ham shank and prevent slippage thereof during the clamping operation.

Disposed in flatwise surface contact with the rear surface of the frame front wall 27 is a vertically shiftable plate 43 formed with a rearwardly offset upper flange 44 disposed in underlying relationship to the lower end of the cylinder 28 and the downwardly extending piston rod 30, the latter being fixedly secured to the vertically extending rear wall 56 of the flange 44 by means of the lock washer and machine screw or bolt 45. The vertically shiftable plate 43 is thus fixedly coupled to the piston rod 30 and shiftable upward and downward with the motion of the piston 29 within the cylinder 28, the plate 43 being upwardly recessed along its lower edge and provided with a plurality of teeth or serrations 54 to clampingly engage the upper surface of a ham shank which may be disposed through the aperture 41 in the front wall 27 of the frame 20.

Disposed laterally of the front wall aperture 41 in overlying engagement with the side marginal edges of the vertically shiftable plate 43 and secured to the frame front wall 27 by means of the nuts and bolts 50 are a pair of edge guides which prevent twisting of the vertically shiftable plate 43 when the latter is actuated. These edge guides each include a block 46 of low friction material secured directly against the rear surface of the frame front wall 27 and having a portion thereof recessed backward from the frame front wall to provide guide grooves for the side marginal edges of the shiftable plate 43, these low friction material blocks 46 having their rear surfaces each overlaid by a protective clamping plate 53 which takes the high compressional clamping force exerted by the nuts and bolts 50.

As best seen in FIGURES 5, 6 and 9, a front guide and spacer bar 47 of the same thickness as the vertically shiftable plate 43 is secured against the lower rear surface of the frame front wall 27, as for example by welding, extending horizontally thereacross and below the level of the teeth or serrations 42 of the front wall aperture 41. Spaced rearwardly of the front guide and spacer bar 47 by the thickness of the low friction material shiftable plate edge guides 46 and their associated clamping plates 53 is a horizontally extending rear guide bar 48 the upper central section of which is arcuately downward recessed as at 49 so as to lie below the teeth 42 formed on the bottom edge of the front wall aperture 41, the rear guide bar 48 being secured by the same nuts and bolts 50 which secure the low friction guide blocks 46 and clamping plates 53.

Between the front and rear guide bars 47 and 48 respectively there is thus defined a guide way extending horizontally across the apparatus and just below the level of the lower serrated edge of the frame front wall aperture 41. Disposed within the guide way and positioned at opposite ends thereof when the apparatus is in its unclamping or up position are a pair of symmetrical auxiliary clamping jaws 57. The lower edges of these auxiliary clamping jaws 57 rest upon the upper surface of the frame bottom wall 24, and the jaws extend vertically upward therefrom to a pair of top edges lying somewhat above the horizontal mid-line of the front wall aperture 41. The edges of the jaws 57 which face one another curve arcuately downward and inward toward one another from a point proximate the jaw tops to a point substantially at the level of the lower edge of the frame front wall aperture 41, these facing arcuate edges being toothed or serrated as at 58. To the rear face of each of the auxiliary clamping jaws 57 is fixedly secured, as by the rivets 59, an outward laterally extending arm 60 pivotally secured as at 61 at its outer end to the lower end of an arm 62 which is itself centrally pivoted by means of the bolts and nuts 65 passing therethrough and secured to the frame front wall 27. The upper end of the arm 62 is pivotally secured, as at 63, to the outer end of an arm 64 the inner end of which is pivotally secured to a boss 51 formed on the upper central back face of the vertically shiftable plate 43 as by means of the pivot pin 52.

As best seen in the showings of FIGURES 4 and 10, when the piston rod 30 is retracted upward within the cylinder 28 to raise the shiftable plate 43, the aforedescribed linkage system which couples the auxiliary clamping jaws 57 to the shiftable plate 43 causes these clamping jaws 57 to move laterally outward away from one another and laterally outward beyond the side edges of the frame front wall aperture 41 to thereby completely open the aperture and permit the easy projection therethrough of the shank end of a ham. When, however, the piston 29 is driven downward within the cylinder 28 by the pneumatic or hydraulic pressure applied thereto, not only is the vertically shiftable plate 43 moved downward to vertically constrict the opening 41 in the frame front wall 27, but also the auxiliary clamping jaws 57 are driven horizontally inward toward one another through the pivoted linkage system to laterally constrict the opening 41 in the manner most clearly illustrated in the showing of FIGURE 2. From the contour of the toothed edges of the auxiliary clamping jaws 57, and as observed in FIGURE 2, it will be appreciated that the auxiliary clamping pressure exerted by the jaws 57 is not purely an inwardly directed lateral one but is an inwardly and upwardly directed force exerted radially inward upon the lower side regions of the ham shank, as for example illustrated in FIGURE 1 showing the shank 66 of a ham 67 being so clamped. Removal of the pressure upon the upper surface of the piston 29 within the cylinder 28, of course, allows the spring 31 to retract the piston 29 upward within the cylinder and thereby cause the piston rod 30 to raise the vertically shiftable plate 43 and simultaneously laterally outwardly shift the auxiliary clamping jaws 57 to open the frame front wall aperture 41 to full size and permit easy withdrawal of the ham 67 from the apparatus. The auxiliary clamping jaws 57, when utilized in the illustrated manner, substantially completely eliminate any loss of injected curing solution by effectively completely closing all of the severed vessels at the ham shank which in the usual case would not be closed absent the auxiliary clamping jaws 57.

Returning now to FIGURES 7 and 8 for an understanding of the manner of actuating the piston 29 within the cylinder 28, it is observed that the valve 38 is of the type generally designated as a shiftable spool valve, having a rear spool 74 and front spool 76 joined together by a reduced cross section intermediate section 75, the valve spool shifting knob 40 being secured upon the forward terminus of the front spool 76 which projects forward from the front surface of the frame front wall 27. As shown in FIGURE 7, the rear spool 74 is close-fittingly peripherally engaged by a surrounding sealing ring 71 while the front spool 76 is similarly close-fittingly surroundingly engaged by a sealing ring 73, and intermediate the two sealing rings 71 and 73 is disposed a third sealing ring 72 positioned approximately centrally about the outer periphery of the valve body central chamber 69. Leading into the central chamber 69 is a valve body inlet passage 68 which connects to the valve inlet fitting 39, and also leading off of the central chamber 69 is a valve body outlet passage 70 which connects to the valve outlet fitting 37, the inlet and outlet passages 68 and 70 being axially shifted relative to one another at the points where they connect with the valve body central chamber 69. Connected to the back end of the rear spool 74 is a rear plug 78 close-fittingly seated within the valve body exhaust passage 77.

The state of the valve shown in FIGURE 7 corresponds, of course, to the actuated or clamping condition of the mechanism as for example shown in FIGURES 1, 2, 3 and 11. The actuation is initiated by the operator of the apparatus by merely pulling forward the valve spool shifting knob 40, moving both of the spools 75 and 76 forward to provide free communication through the valve passages 68, 69 and 70 to thereby permit pressurized air at the inlet fitting 39 to be transmitted through the valve to the outlet fitting 37 and to the upper surface of the piston 29 within the cylinder 28, thereby driving the piston downward and actuating the mechanism. Escape of the pressurized air from the valve 38 is prevented by the sealing rings 71 and 73 close-fittingly engaged respectively about the rear spool 74 and front spool 76. In order to unclamp the mechanism and thereby release a ham clamped therein after completion of curing solution injection into a ham, the spool shifting knob 40 is merely pushed rearward, as for example shown in FIGURE 8, to thereby cause the front spool 76 to be peripherally engaged by the sealing ring 72 and thereby isolate the valve body central chamber 69 from the inlet 39, while simultaneously the rear spool 74 is shifted backward out of sealing engagement with the sealing ring 71 to thereby connect the valve body outlet passage 70 to the valve exhaust passage 77 through the central chamber 69, thus exhausting the pressurized air from the cylinder 28 and allowing the compression spring 31 to retract the piston rod 30 to thereby shift the plate 43 and auxiliary clamping jaws 57 into retracted unclamping position.

Having now described my invention in connection with a particularly illustrated embodiment thereof, it will be appreciated that variations and modifications of the same may now occur to those persons normally skilled in the art without departing from the essential scope or spirit of my invention, and accordingly, it is intended to claim the same broadly as well as specifically as indicated by the appended claims.

What is claimed as new and useful is:

1. A clamping apparatus for constricting the shank end of a ham to close off all of the severed blood vessels preparatory to injecting curing solution into the ham at the butt end thereof, comprising in combination, an upstanding rigid frame structure having a substantially vertical rigid front wall and an open back, said frame front wall being apertured proximate to but at an elevation somewhat above the frame bottom to permit the shank of a ham to be projected freely therethrough, a vertically shiftable rigid plate clamping member disposed immediately adjacent to and extending laterally across the rear surface of said frame front wall and normally positioned above the aperture in said frame front wall, selectively actuatable means coupled to said rigid plate clamping member for down shifting the same to thereby reduce the vertical extent of the frame front wall aperture, slidably shiftable auxiliary clamping means disposed proximate to and normally positioned laterally of the aperture in said frame front wall in a plane immediately adjacent and parallel to the plane of said vertically shiftable rigid plate clamping member, and drive means coupled to said auxiliary clamping means for laterally inwardly slidably shifting said auxiliary clamping means to thereby reduce the horizontal extent of the said frame front wall aperture, whereby a ham shank projected through said frame front wall aperture is circumambiently constricted when said selectively actuatable means and said drive means are operated to respectively downshift said vertically shiftable rigid plate clamping member and inwardly shift said auxiliary clamping means.

2. A clamping apparatus for constricting the shank end of a ham to close off all of the severed blood vessels preparatory to injecting curing solution into the ham at the butt end thereof, comprising in combination, an upstanding rigid frame structure having a substantially vertical rigid front wall and an open back, said frame front wall being apertured proximate to but at an elevation somewhat above the frame bottom to permit the shank of a ham to be projected freely therethrough, a vertically shiftable rigid plate clamping member disposed immediately adjacent to and extending laterally across the rear surface of said frame front wall and normally positioned above the aperture in said frame front wall, selectively actuatable means coupled to said rigid plate clamping member for downshifting the same to thereby reduce the vertical extent of the frame front wall aperture, a pair of rigid auxiliary clamping members disposed proximate to and normally positioned laterally at opposite sides of and outward beyond the said frame front wall aperture in a plane immediately adjacent and parallel to the plane of said vertically shiftable rigid plate clamping member, and drive means coupled to said pair of auxiliary clamping members for simultaneously laterally slidably shifting the same inward toward one another to thereby reduce the horizontal extent of the said frame front wall aperture, whereby a ham shank projected through said frame front wall aperture is circumambiently constricted when said selectively actuatable means and said drive means are operated to respectively downshift said vertically shiftable rigid plate clamping member and inwardly shift said pair of auxiliary clamping members.

3. A clamping apparatus for constricting the shank end of a ham to close off all of the severed blood vessels preparatory to injecting curing solution into the ham at the butt end thereof, comprising in combination, an upstanding rigid frame structure having a substantially vertical rigid front wall and an open back, said frame front wall being apertured proximate to but at an elevation somewhat above the frame bottom to permit the shank of a ham to be projected freely therethrough, a vertically shiftable rigid plate clamping member disposed immediately adjacent to and extending laterally across one surface of said frame front wall and normally positioned above the aperture in said frame front wall, selectively actuatable means coupled to said rigid plate clamping member, for downshifting the same to thereby reduce the vertical extent of the frame front wall aperture, slidably shiftable auxiliary clamping means disposed proximate to and normally positioned laterally of the aperture in said frame front wall, and drive means coupled to said auxiliary clamping means and to said selectively actuatable means for laterally inwardly slidably shifting said auxiliary clamping means to thereby reduce the horizontal extent of the said frame front wall aperture when said selectively actuatable means is operated to downshift said vertically shiftable clamping member, whereby a ham shank projected through said frame front wall aperture is circumambiently constricted by said vertically shiftable clamping member and said auxiliary clamping means when said selectively actuatable means is operated.

4. A clamping apparatus for constricting the shank end of a ham to close off all of the severed blood vessels preparatory to injecting curing solution into the ham at the butt end thereof, comprising in combination, an upstanding rigid frame structure having a substantially vertical rigid front wall and an open back, said frame front wall being apertured proximate to but at an elevation somewhat above the frame bottom to permit the shank of a ham to be projected freely therethrough, a vertically shiftable rigid plate clamping member disposed immediately adjacent to and extending laterally across one surface of said frame front wall and normally positioned above the aperture in said frame front wall, selectively actuatable means coupled to said rigid plate clamping member for downshifting the same to thereby reduce the vertical extent of the frame front wall aperture, a pair of rigid auxiliary clamping members disposed proximate to and normally positioned laterally at opposite sides of and outward beyond the said frame front wall aperture, and drive means coupled to said pair of auxiliary clamping members for simultaneously laterally slidably shifting the same inward toward one another to thereby reduce the horizontal extent of the said frame front wall aperture, said drive means being also coupled to and driven by said selectively actuatable means, whereby a ham shank projected through said frame front wall aperture is circumambiently constricted when said selectively actuatable means and said drive means are operated to respectively downshift said vertically shiftable rigid plate clamping member and inwardly shift said pair of auxiliary clamping members.

5. A clamping apparatus for constricting the shank end of a ham to close off all of the severed blood vessels preparatory to injecting curing solution into the ham at the butt end thereof, comprising in combination, a first pair of rigid clamping members disposed in immediately adjacent parallel planes and shiftable relatively to one another within their respective planes, each of said members having a concave clamping edge presenting toward the concave clamping edge of the other member and said members being shiftable toward one another to cause at least the outer portions of the concave edges of at least one of said members to ride a predetermined minimum distance past the corresponding outer portions of the concave edges of the other of said pair of members to thereby define therebetween an aperture of variable size, a second pair of rigid clamping members spaced apart from one another respectively laterally outward substantially to the opposite outer portions of the concave edge of one of said first pair of clamping members and disposed for slidable shifting motion toward one another inward from opposite sides of the said variable size aperture defined by the concave edges of said first pair of members along a line oriented transversely to the line of shifting of said first pair of members and in a plane that is substantially parallel to and closely adjacent to the plane of shifting of one of said first pair of clamping members to thereby reduce the horizontal extent of the said variable size aperture, means for supporting and guiding said first and second pairs of members throughout their respective ranges of slidable shifting motion, first drive means coupled to at least one of said first pair of clamping members for slidably shifting the same toward the other of said first pair of members, second drive means coupled to at least one of said second pair of clamping members for slidably shifting the same toward the other of said second pair of members, and selectively actuatable means for operating said first and second drive means, whereby, a ham shank projected through said variable size aperture is circumambiently constricted when said selectively actuatable means operates said first and second drive means.

6. The apparatus according to claim 5 wherein said first and second drive means are intercoupled and said selectively actuatable means operates both of said drive means to simultaneously shift the slidably shiftable ones of said first and second pairs of clamping members.

7. The apparatus according to claim 5 wherein said second drive means comprises a pivoted linkage system also coupled to said first drive means, and said selectively actuatable means is coupled to said first drive means, whereby said first drive means when operated causes said second drive means to be operated.

8. A clamping apparatus for constricting the shank end of a ham to close off all of the severed blood vessels preparatory to injecting curing solution into the ham at the butt end thereof, comprising in combination, an upstanding rigid frame structure having a substantially vertical rigid front wall and an open back, said frame front wall being apertured proximate to but at an elevation somewhat above the frame bottom to permit the shank of a ham to be projected freely therethrough, a vertically shiftable rigid plate clamping member disposed immediately adjacent to and extending laterally across one surface of said frame front wall and normally positioned above the aperture in said frame front wall, selectively atcuatable means coupled to said rigid plate clamping member for downshifting the same to thereby reduce the vertical extent of the frame front wall aperture, slidably shiftable auxiliary clamping means disposed proximate to and normally positioned laterally of the aperture in said frame front wall, guide means extending horizontally across said frame structure proximate the bottom thereof and secured to the frame to thereby provide a guideway for said shiftable auxiliary clamping means, and drive means coupled to said auxiliary clamping means and to said selectively actuatable means for laterally inwardly slidably shifting said auxiliary clamping means within said guideway to thereby reduce the horizontal extent of the said frame front wall aperture, whereby a ham shank projected through said frame front wall aperture is circumambiently constricted when said selectively actuatable means and said drive means are operated to respectively downshift said vertically shiftable rigid plate clamping member and inwardly shift said auxiliary clamping means.

9. The apparatus according to claim 8 wherein said guide means comprise a pair of spaced-apart parallel rigid bars between which are disposed said auxiliary clamping means.

References Cited in the file of this patent

UNITED STATES PATENTS

| | | |
|---|---|---|
| 693,980 | Muller | Feb. 25, 1902 |
| 1,246,557 | Crowder | Nov. 13, 1917 |
| 1,960,501 | Maull | May 29, 1934 |
| 1,966,338 | Eggimann | July 10, 1934 |
| 2,072,694 | Walter | Mar. 2, 1937 |
| 2,864,304 | Gillman | Dec. 16, 1958 |
| 2,976,656 | Gardner | Mar. 28, 1961 |

FOREIGN PATENTS

| | | |
|---|---|---|
| 644,498 | Great Britain | Oct. 11, 1950 |
| 670,939 | France | Aug. 26, 1929 |
| 722,278 | Great Britain | Jan. 19, 1955 |